(12) United States Patent
Deiretsbacher et al.

(10) Patent No.: US 8,078,672 B2
(45) Date of Patent: Dec. 13, 2011

(54) BIDIRECTIONAL ASYNCHRONOUS DATA COMMUNICATION

(75) Inventors: Karl-Heinz Deiretsbacher, Effeltrich (DE); Christian Hock, Fürth (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 445 days.

(21) Appl. No.: 11/524,609

(22) Filed: Sep. 21, 2006

(65) Prior Publication Data

US 2007/0067496 A1    Mar. 22, 2007

(30) Foreign Application Priority Data

Sep. 22, 2005  (DE) .......................... 10 2005 045 346

(51) Int. Cl.
    *G06F 15/16*    (2006.01)
(52) U.S. Cl. .......................... 709/203; 709/217; 370/401
(58) Field of Classification Search ................... 709/203
    See application file for complete search history.

(56) References Cited

U.S. PATENT DOCUMENTS

| | | | |
|---|---|---|---|
| 2001/0047420 A1 | 11/2001 | Talanis et al. | |
| 2003/0154244 A1* | 8/2003 | Zellers et al. | 709/203 |
| 2003/0193965 A1* | 10/2003 | Higuchi et al. | 370/466 |
| 2004/0255156 A1* | 12/2004 | Chan et al. | 713/201 |
| 2005/0021663 A1* | 1/2005 | Knauerhase et al. | 709/217 |
| 2005/0060163 A1* | 3/2005 | Barsness et al. | 705/1 |
| 2005/0089016 A1* | 4/2005 | Zhang et al. | 370/351 |
| 2005/0130673 A1* | 6/2005 | Annamalai | 455/456.2 |
| 2006/0077988 A1* | 4/2006 | Cheng et al. | 370/401 |
| 2008/0052359 A1* | 2/2008 | Golan et al. | 709/206 |

FOREIGN PATENT DOCUMENTS

DE    199 04 331 C1    8/2000

\* cited by examiner

*Primary Examiner* — Firmin Backer
*Assistant Examiner* — Hamza Algibhah

(57) ABSTRACT

In one aspect, method for bidirectional asynchronous data communication between a client and a server over the Internet via a hypertext transfer protocol based on a request/response paradigm is provided. With the aid of a single communication channel, a communication sequence is initiated by the client, such that the two partners are able to exchange data asynchronously and bidirectionally. After the client has established the connection via a request the client sends data to the server as a further request, while the server sends data to the client as a response to the last request. If the server has no data to send, then after a timeout time it sends a dummy response in order to keep the channel open. If the server receives a new request, then it terminates the old one and sends any data remaining to be sent as a response to the new request.

12 Claims, 2 Drawing Sheets

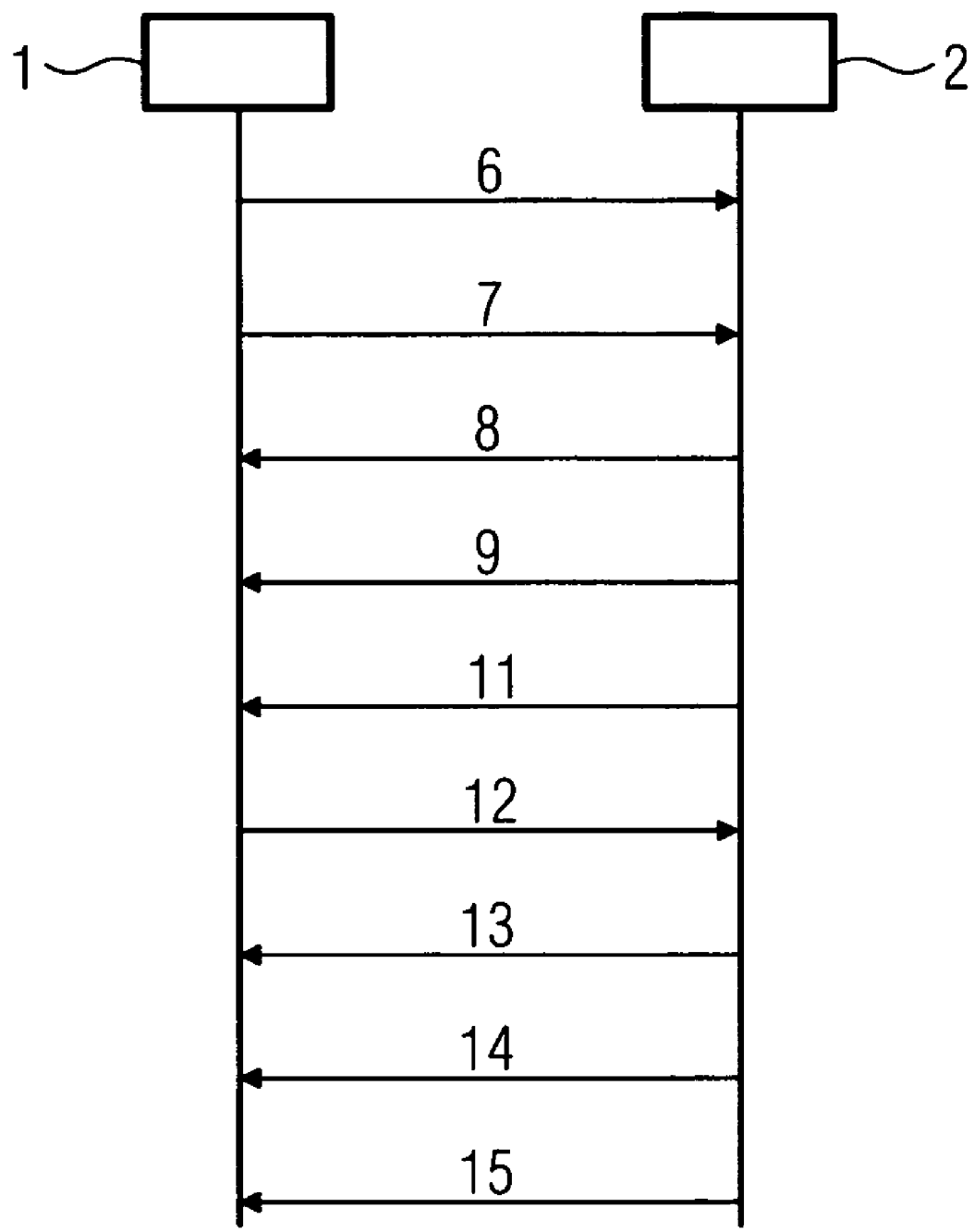

BIDIRECTIONAL ASYNCHRONOUS DATA COMMUNICATION

CROSS REFERENCE TO RELATED APPLICATIONS

This application claims priority of German application No. 102005045346.5DE filed Sep. 22, 2005, which is incorporated by reference herein in its entirety.

FIELD OF INVENTION

The invention relates to a method for bidirectional asynchronous data communication which, initiated by a client, is established between the client and a server, over a data network, the Internet in particular, by means of a hypertext transfer protocol based on a request/response paradigm. The invention also relates to a program for executing such a method and also a system comprising at least one client and one server which are provided for the bidirectional asynchronous data communication.

SUMMARY OF INVENTION

Such a method is used in all data networks in which bidirectional communication is required between a client and a server and the available transmission protocol is based on a request/response paradigm. An example of such a transmission protocol is the Hypertext Transfer Protocol HTTP used by the World Wide Web (WWW) Internet service in which the client only receives data on request as a response from the server. The WWW is therefore a pull medium, in other words the client "pulls" content to itself by requesting it and the server has no capability to send data to the client on its own initiative. This capability, known as server push, is however necessary for Internet services such as online chats but continues to remain unsupported by HTTP. Efforts in the past to extend HTTP in this direction (cf. for example HTTP-NG) have failed not least because of security concerns.

The task of operating data communication bidirectionally, in other words independent of both sides, is fundamental to automation technology—for example in order to forward alarms or events, changes in values etc. Under the proviso that communication takes place on the WWW, the only means of satisfying the requirement for bidirectional communication is to "tunnel" this in such a manner in the HTTP that any firewall or proxy server present in the communication path is unable to recognize and prevent it. In the WWW there is no means of exerting any influence on the components present in the communication path, such as for example the firewall of an Internet service provider. Any communication must therefore manage with the minimal mechanisms that are offered on the WWW. This means exclusively employing HTTP communication by way of port 80.

A method is known from DE 199 04 331 C1 which uses two HTTP channels to establish a communication sequence initiated by the client, by way of which the two partners are able to exchange data asynchronously and bidirectionally.

An object of the invention is to improve the known method to the effect that only a single communication channel is required for the communication.

This object is achieved by a method of the type described in the introduction, such that the client sets up a communication channel by means of a request, the server, if it has data to send, sends this data as a response to the client request in at least one partial response to the client, whereby a partial response identifying an end of the response is provided, the server, if it has no data to send, delays the response to the client request until a timeout time is reached, after which it sends a dummy response to the client, and the client, if it has data to send, sends this data as a new request to the server, whereby the server terminates the previous request by means of a partial response identifying an end of the response and the further server/client communication is sent to the client as a response to the new request in at least one partial response.

The object is also achieved by a program for executing the aforementioned method and also by a system.

After the communication channel has been opened by the client, both client and server have the capability to send data to each another, independently of one another, and bidirectionally. The server sends its data as a response to the open request from the client; the client sends its data as a new request. If the server has no data to send, then after a timeout time it sends a dummy response in order to keep the channel open. If the server receives a new request, then it terminates the old one and sends any data that remains to be sent as a response to the new request. In this manner, only one request is ever open at any time, in response to which the server can send data to the client, with the result that bidirectional communication is thus possible even in the case of protocols based on the request/response paradigm. Furthermore, the method according to the invention requires only one communication channel. Since HTTP connections for example are as a rule restricted on client and server side to 2-4, a halving of the resources when compared with the known method is a major gain, particularly when a plurality of logical connections are to be set up to one or more servers.

Advantageously, the client can send data to the server again as often as desired as a new request, while the server sends its response in at least one partial response to the client.

In an advantageous form of the embodiment of the method the timeout time is chosen to be less than 30 seconds. As a result of the dummy response which the server sends after this time, this means that any firewall which may be present does not close the connection (the "famous" 30-second window).

In a further advantageous embodiment, a wakeup packet is initiated as a new request by the client. The server acknowledges this by sending a dummy response. By this means both parties, client and server, know that they are still "alive".

In a particularly advantageous embodiment, HTTP/1.1 is used as the hypertext transfer protocol. The HTTP/1.1 protocol allows the transmission of a plurality of HTTP requests over one TCP/IP connection (TCP: Transmission Control Protocol, IP: Internet Protocol). In this situation, the request/response mechanism of HTTP must of course be adhered to. HTTP/1.1 does however offer the capability for pipelining. In this situation, the client sends a plurality of requests over a TCP/IP connection without waiting for the responses to the individual requests during the process. The server must send the responses in the same sequence as it received the requests. Through the use of pipelining the problem is thus avoided in that the client can send new data before the server has sent the complete response. The additional use of chunked data encoding ("chunked transfer coding") eliminates the need to keep count of the transmitted data items and to reestablish the channel when the volume of data notified initially has been transmitted. In this situation, an end of a response is identified by sending a "0 chunk packet", in other words by a packet having a data size of zero. Pipelining and chunked data encoding are HTTP mechanisms which are described in RFC 2616 ("Request For Comments"). By combining the two HTTP/1.1 communication tools pipelining and chunked data encoding it becomes possible to send data and to receive data bidirectionally, independently of one another. The only restriction is that the communication must be set up by the client because the latter can be "hidden" in a NAT or PAT network, for example. (NAT: Network Address Translation, PAT: Port Address Translation.)

BRIEF DESCRIPTION OF THE DRAWINGS

The invention will be described in detail and explained in the following with reference to the embodiments represented in the figures. In the drawings FIG. 3 shows a flowchart of a further example of an embodiment of the method according to the invention.

DETAILED DESCRIPTION OF INVENTION

Figure 1:
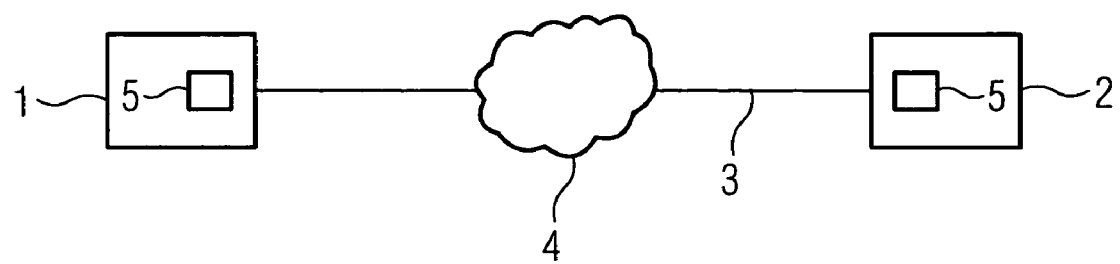
FIG. 1 shows a schematic representation of the client/server system.

FIG. 1 shows a schematic representation of a client 1 and a server 2 which are each connected to a data network 4, such as the Internet for example. Using a hypertext transfer protocol which is based on the request/response paradigm, a communication channel 3 is opened over this data network 4 by the client 1 by means of a request to the server 2. On this communication channel 3 the server 2 can now send data as a response to the client request to the client 1 and the client 1 can send data as new requests to the server 2. This is made possible both on the client side and also on the server side by means of a program 5 which is provided in order to execute the method according to the invention.

Figure 2:
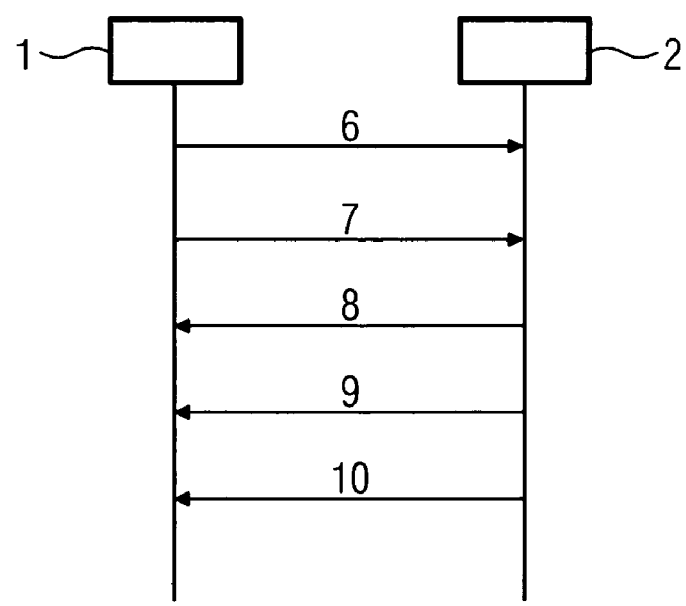
FIG. 2 shows a flowchart of an example of an embodiment of the method according to the invention.

FIG. 2 shows the flowchart for an example of client/server communication using the hypertext transfer protocol HTTP/1.1 which is based on the request/response paradigm. In a first step, the client 1 sets up a connection with the server 2 by sending a first request 6. By sending a second request 7, using the HTTP pipelining mechanism because the first request 6 is still open, it sends data in the form of a (productive) request to the server 2 which consequentially terminates the first (setup) request 6 with a dummy response 8 using the HTTP chunk data encoding mechanism by sending a 0-chunk packet. The continuing server/client communication takes place by way of the second request 7. The server 2 sends a (productive) response 9 as a partial response to the second request to the client 1. This partial response 9 is sent using chunk data encoding as a chunk of length X. The further (productive) data is sent as further partial responses as chunks of length X up until the last data packet 10 which is a chunk of length X followed by a chunk of length 0.

FIG. 3 shows the flowchart for a further example of client/server communication using HTTP/1.1. In a first step, the client 1 again sets up a connection with the server 2 by sending a first request 6. By sending a second request 7 using pipelining because the first request 6 is still open, it sends data in the form of a (productive) request to the server 2 which consequentially terminates the first (setup) request 6 with a 0-chunk packet, the dummy response 8. The continuing server/client communication takes place by way of the second request 7. The server 2 sends two (productive) responses 9, 11 as partial responses to the second request 7 as chunks of length X to the client 1. In the next step, the client 1 uses pipelining to send further (productive) data by means of a third request 12 to the server 2. As a consequence of this the server 2 terminates the previous, second, request 7 by sending a 0-chunk packet 13 and sends further data relating to the first (productive) request 7 by way of the third HTTP response 14. Finally, the server 2 sends data relating to the second (productive) request 12 with the last data packet 15 which comprises a chunk of length X followed by a 0-chunk packet.

To summarize, the invention relates to a method for bidirectional asynchronous data communication between a client and a server over a data network, the Internet in particular, by means of a hypertext transfer protocol based on a request/response paradigm. The object of the invention is, with the aid of a single communication channel, to establish a communication sequence initiated by the client, by way of which the two partners are able to exchange data asynchronously and bidirectionally. This object is achieved by the fact that after the client has established the connection by means of a request the client sends data to the server as a further request, while the server sends data to the client as a response to the last request. If the server has no data to send, then after a timeout time it sends a dummy response in order to keep the channel open. If the server receives a new request, then it terminates the old one and sends any data remaining to be sent as a response to the new request. In this manner, only one request is ever open at a time, in response to which the server can send data to the client, with the result that even in the case of protocols based on the request/response paradigm bidirectional communication on a single channel is thus possible.

The invention claimed is:

1. A computerized method for establishing a bidirectional-asynchronous-data communication between a client and a server, the communication established over the Internet and via a hypertext transfer protocol based on a request/response paradigm, the method comprising:

setting up one communication channel via a first request by the client;

sending a productive response to the client, said productive response comprising at least one first partial response to the client by the server when the server has communication data packets to send to the client, wherein at least one of additional partial responses identifies an end of the productive response by way of a zero-chunk packet;

sending a dummy response to the client by the server when the server has no data to send to the client;

coupling a firewall to said one communication channel, the firewall configured with a time window lasting a predefined time interval for closing said one communication channel when the server has no data to send to the client;

sending the dummy response after a timeout time;

selecting a duration of the timeout time for sending the dummy response, wherein the duration of the selected timeout time for sending the dummy response is less than the predefined time interval of the firewall window to impede the firewall from closing said one communication channel, the sending of the dummy response maintaining the one communication channel open between the client and the server when the server has no data to send to the client;

sending a second request to the server, the second request comprising a productive request by the client when the client has communication data packets to send to the server, wherein at least the second request comprises a pipelining request;

terminating the first request in response to the second request by sending a second partial response identifying the end of the first request by way of a zero-chunk packet, the terminating of the first request being performed notwithstanding of any communication data packets waiting to be sent from the first request; and sending a third partial response to the client by the server in response to the second request, wherein the third partial response contains any said communication data packets waiting to be sent from a presently ended first request, wherein the bidirectional data communication including communication data packets for each productive request, communication data packets for each productive response and dummy response between the client and the server occurs only over said one communication channel.

2. The method as claimed in claim 1, further comprises:
sending a third request to the server by the client;
terminating the second request by sending a fourth partial response identifying the end of the second response; and
sending a fourth partial response to the client by the server in response to the third request.

3. The method as claimed in claim 1, wherein the predefined time interval of the firewall window is 30 seconds and the timeout time is less than 30 seconds.

4. The method as claimed in claim 1, wherein the first client request is a wakeup packet which the server acknowledges by sending a dummy response.

5. The method as claimed in claim 1, wherein HTTP/1.1 is used as the hypertext transfer protocol.

6. An article of manufacturing for use by a client computer and a server computer operatively connected to one another in a data communications network, the article of manufacturing comprising computer-readable media containing computer-readable program code comprising instructions for providing bidirectional asynchronous data communication between the client computer and the server computer, the computer-readable program code when executed by said computers performs a method comprising:

receiving a first request for setting up one communication channel in the data communications network by the client computer;

sending a first response comprising a first productive response when the server has communication data packets to send to the client computer in response to the first request;

receiving a second request from the client computer, wherein at least the second request comprises a pipelining request;

terminating the first request from the client computer by sending an end of the first request by way of a zero-chunk packet, the terminating of the first request being performed notwithstanding of any communication data packets waiting to be sent from the first request; and sending a second response comprising a second productive response when the server has further communication data packets to send to the client computer in response to the second request, wherein the second productive response contains any said communication data packets waiting to be sent from a presently ended first request, wherein the first productive response and the second productive response are selected from the group consisting of:
a partial response identifying an end of at least one of the first and second productive responses by way of a zero-chunk packet, and
a plurality of partial responses wherein one of the partial responses identifies an end of at least one of the first and second responses by way of a zero-chunk packet, coupling a firewall to said one communication channel, the firewall configured with a time window lasting a predefined time interval for closing said one communication channel when the server has no data to send to the client; wherein at least one of the client requests is a wakeup packet, and further wherein the server computer acknowledges said at least one client request with a dummy response sent after a timeout time; and selecting a duration of the timeout time for sending the dummy response, wherein the duration of the selected timeout time for sending the dummy response is less than the predefined time interval of the firewall window to impede the firewall from closing said one communication channel, the sending of the dummy response maintaining the one communication channel open between the client and the server when the server has no data to send to the client; wherein the bidirectional data communication including communication data packets for each productive response and dummy response between the client and the server occurs only over said one communication channel.

7. The article of manufacturing as claimed in claim 6, wherein the predefined time interval of the firewall window is 30 seconds and the timeout time is less than 30 seconds.

8. A system comprising a client computer and a server computer in a data communications network, the client computer and the server computer operatively connected to one another via a bidirectional asynchronous data communication, the communication initiated by the client computer over the data network via a hypertext transfer protocol based on a request/response paradigm, comprising:

a first request sent to the server computer from the client computer for setting up one communication channel in the communications network;

a response sent to the client computer, the response comprising a productive response from the server computer in at least one partial response when the server computer has communication data packets to send in response to the first client request, at least one of the partial responses identifying an end of response by way of a zero-chunk packet;

a firewall coupled to said one communication channel, the firewall configured with a time window lasting a predefined time interval for closing said one communication channel when the server has no data to send to the client;

a dummy response sent to the client computer from the server computer when the server computer has no data to be sent in response to the first client request, the dummy response sent after a timeout time;

a duration of the timeout time selected for sending the dummy response, wherein the duration of the selected timeout time for sending the dummy response is less than the predefined time interval of the firewall window to impede the firewall from closing said one communication channel, the sending of the dummy response maintaining the one communication channel open between the client and the server when the server has no data to send to the client; and a second request sent to the server computer, the second request comprising a productive request by the client computer when the client computer has communication data packets to send to the server computer, wherein at least the second request comprises a pipelining request, wherein the first request is terminated by the server computer via a partial response identifying an end of the response by way of a zero-chunk packet, the terminating of the first request being performed notwithstanding of any communication data packets waiting to be sent from the first request, and wherein the communication to the client computer after the second request is via at least one second partial response, wherein said at least one second partial response contains any said communication data packets waiting to be sent from a presently ended first request, wherein the bidirectional data communication including communication data packets for each productive request, communication data packets for each productive response and dummy response between the client and the server occurs only over said one communication channel.

9. The system as claimed in claim 8, wherein the predefined time interval of the firewall window is 30 seconds and the timeout time is less than 30 seconds.

10. The system as claimed in claim 9,
wherein the first client request is a wakeup packet, and
wherein the dummy response is sent to the client in response to the wakeup packet.

11. The system as claimed in claim 10, wherein the hypertext transfer protocol is HTTP/1.1.

12. The system as claimed in claim 11, wherein the data network is the Internet.

* * * * *